(12) United States Patent
Foege

(10) Patent No.: US 8,939,046 B2
(45) Date of Patent: Jan. 27, 2015

(54) CONNECTING ROD BOLT HAVING LOCATING FEATURES

(75) Inventor: Aaron Gamache Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 13/408,867

(22) Filed: Feb. 29, 2012

(65) Prior Publication Data

US 2013/0220071 A1    Aug. 29, 2013

(51) Int. Cl.
F16C 7/00    (2006.01)
F16B 33/00    (2006.01)

(52) U.S. Cl.
USPC ........................................ 74/579 E; 411/378

(58) Field of Classification Search
CPC ........... F16B 39/08; F16B 35/041; F16C 9/07
USPC ....................... 74/579, 579 R, 479 E; 411/378
See application file for complete search history.

(56) References Cited

U.S. PATENT DOCUMENTS

| | | | | |
|---|---|---|---|---|
| 281,564 | A | * | 7/1883 | Sanders ........................ 411/402 |
| 2,407,928 | A | * | 9/1946 | Herreshoff et al. ......... 411/366.1 |
| 2,912,031 | A | * | 11/1959 | Bensinger et al. ............. 411/176 |
| 3,176,808 | A | * | 4/1965 | Matthews .................. 403/408.1 |
| 3,455,587 | A | | 7/1969 | Gallois |
| 4,018,132 | A | * | 4/1977 | Abe .............................. 411/413 |
| 4,114,961 | A | * | 9/1978 | Pithie ............................ 384/430 |
| 4,338,054 | A | | 7/1982 | Dahl |
| 4,396,309 | A | | 8/1983 | McCormick |
| 4,436,443 | A | | 3/1984 | McCormick |
| 4,518,276 | A | | 5/1985 | Mitchell et al. |
| 5,036,727 | A | | 8/1991 | Engel |
| 6,178,849 | B1 | * | 1/2001 | Matthews .................... 74/579 E |
| 6,250,275 | B1 | | 6/2001 | Bock et al. |
| 6,264,414 | B1 | | 7/2001 | Hartmann et al. |
| 6,422,755 | B1 | | 7/2002 | Cadle et al. |
| 6,467,988 | B1 | | 10/2002 | Czachor et al. |
| 6,736,744 | B1 | * | 5/2004 | Wigsten et al. ............... 474/152 |
| 7,240,584 | B1 | * | 7/2007 | Luehrmann et al. ........ 74/579 R |
| 2002/0141846 | A1 | | 10/2002 | McGough |

FOREIGN PATENT DOCUMENTS

FR    2352203    12/1977
JP    7293546    11/1995

OTHER PUBLICATIONS

EMD Rod Bolt Circa 2001, one page.
Caterpillar Rod Bolt Circa 2010, one page.

* cited by examiner

*Primary Examiner* — Thomas Diaz
(74) *Attorney, Agent, or Firm* — Finnegan, Henderson, Farabow, Garrett & Dunner, LLP

(57) ABSTRACT

A connecting rod bolt is provided for use with a connecting rod assembly. The connecting rod bolt may have a body portion having a first end, a threaded second end opposite the first end, and an outer surface extending in a length direction from the first end to the second end. The connecting rod bolt may further have a plurality of locating features having a radius aligned with the outer surface and a plurality of clearance features disposed on the outer surface between adjacent locating features, wherein a distance from a center of the body portion to an outer surface of each clearance feature is less than the radius of the plurality of locating features. The connecting rod bolt may also have a head portion connected to the first end of the body portion.

16 Claims, 5 Drawing Sheets

CONNECTING ROD BOLT HAVING LOCATING FEATURES

TECHNICAL FIELD

The present disclosure relates generally to a connecting rod bolt, and more particularly, to a connecting rod bolt having locating features.

BACKGROUND

Traditionally, a connecting rod and cap are used for connecting a piston to a crankshaft in an internal combustion engine. The connecting rod is connected to the cap using a plurality of bolts. Extremely small clearances exist between bolt locating surfaces and mating surfaces on the connecting rod and cap. During operation of the engine, the connecting rod can deflect, causing the bolt and rod to come into contact with each other. This contact and motion can cause fretting, microscopically welding the bolt and rod together where their surfaces contact. Further motion of the bolt and rod can break these welds, causing material damage such as cracking. Because connecting rod bolts are highly stressed tensile components, any cracks can propagate and cause failure of the bolt and rod.

An anti-fretting bolt is described in U.S. Pat. No. 3,455,587 ("the '587 patent") of Gallois that issued on Jul. 15, 1969. In particular, the '587 patent describes a bolt with a bearing portion having axially-spaced circular grooves with a U-shaped cross-section defining hollow portions separated by ribs. Cracks may still form in the bolt during operation, but the cracks cannot reach stress lines of the bolt as easily as in standard bolts that do not contain the hollow portions and ribs.

While the bolt of the '587 patent may help to reduce bolt and rod failure, it may still be less than optimal. Specifically, the bolt design of the '587 patent only inhibits crack propagation, but does not prevent cracks from forming. Over time, the bolt of the '587 patent may still fail due to fretting and subsequent crack formation.

The connecting rod bolt of the present disclosure solves one or more of the problems set forth above and/or other problems with existing technologies.

SUMMARY

In one aspect, the disclosure is directed to a connecting rod bolt. The connecting rod bolt may include a body portion having a first end, a threaded second end opposite the first end, and an outer surface extending in a length direction from the first end to the second end. The connecting rod bolt may further include a plurality of locating features having a radius generally aligned with the outer surface and a plurality of clearance features positioned between adjacent locating features. A distance from a center of the body portion to each clearance feature may be less than the radius of the plurality of locating features. The connecting rod bolt may also include a head portion connected to the first end of the body portion.

In a second aspect, the disclosure is directed to a connecting rod bolt. The connecting rod bolt may include a body portion having a first end, a threaded second end opposite the first end, and an outer surface extending in a length direction from the first end to the second end. The connecting rod bolt may further include a plurality of locating features disposed in an axial alignment zone of the body portion. A length of the axial alignment zone may be less than a length of the body portion. The connecting rod bolt may also include a plurality of clearance features positioned between adjacent locating features. The connecting rod bolt may also include a head portion connected to the first end of the body portion.

In a third aspect, the disclosure is directed to a connecting rod assembly. The connecting rod assembly may include a connecting rod having a first shoulder and first bore disposed within the first shoulder. The connecting rod assembly may further include a cap having a second shoulder and a second bore disposed within the second shoulder in alignment with the first bore, and a connecting rod bolt disposed in the first and second bores. The connecting rod bolt may include a body portion having a first end, a threaded second end opposite the first end, and an outer surface extending in a length direction from the first end to the second end. The connecting rod bolt may further include a plurality of locating features, each having a radius disposed in an axial alignment zone of the outer surface and configured to contact the first and second bores. A length of the axial alignment zone may be less than a length of the body portion. The connecting rod bolt may also include a plurality of clearance features positioned between adjacent locating features of the plurality of locating features. A distance from a center of the body portion to an outer surface of each clearance feature may be less than the radius of each of the plurality of locating features. The connecting rod bolt may still further include a head portion connected to the first end of the body portion. The head portion may be configured to contact the first shoulder of the connecting rod. The connecting rod assembly may further include a nut configured to engage the second shoulder of the cap and the threaded second end of the connecting rod bolt.

DETAILED DESCRIPTION

Figure 1:
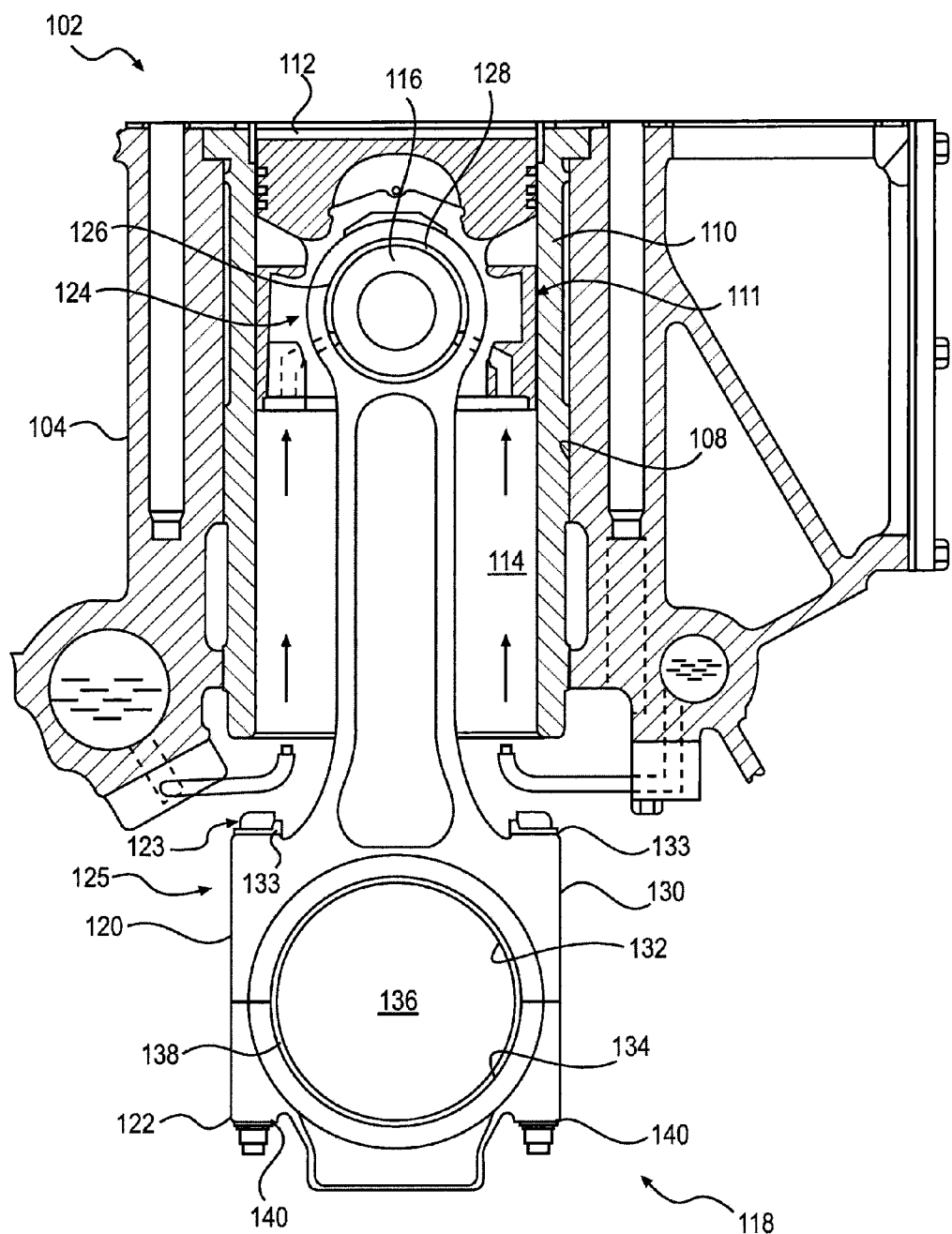
FIG. 1 is a cross-sectional illustration of an exemplary disclosed internal combustion engine.

FIG. 1 illustrates an engine 102. Engine 102 is depicted in FIG. 1 and described herein as a diesel-fueled, internal combustion engine. However, it is contemplated that engine 102 may embody any other type of internal combustion engine such as, for example, a gasoline or gaseous fuel-powered engine. It is contemplated that engine 102 may include any number of combustion chambers and that the combustion chambers may be disposed in an "in-line" configuration, in a "V" configuration, or in any other conventional configuration.

Engine 102 may include an engine block 104 at least partially defining a cylinder 108 and a cylinder liner 110 disposed in cylinder 108. A combustion chamber 112 may be formed within cylinder liner 110, and a piston 111 may be located to reciprocate within combustion chamber 112. Engine block 104 may also include a combustion air inlet (not shown), an air scavenging channel (not shown), and an exhaust outlet (not shown) that may be in communication with combustion chamber 112. Piston 111 may include a piston pin 116 that connects piston 111 to a rod assembly 118.

Rod assembly 118 may include a connecting rod 120, a cap 122, and a plurality of connecting rod bolts 123. Connecting rod 120 may include a first end 124 and an opposing second end 125. First end 124 may include an opening 126 that houses a bearing 128. Bearing 128 may have an internal diameter that is sized to receive piston pin 116. Second end 125 may include a yoke 130 having a semi-circular bearing portion 132 and a pair of shoulders 133. Cap 122 may also include a semi-circular bearing portion 134 that, together with semi-circular bearing portion 132, may define a circular opening 136 for receiving a crankshaft (not shown) of engine 102. Circular opening 136 may also include a bearing 138. Bearing 138 may be a friction-type bearing that may be fabricated from a malleable material, for example aluminum. It should be noted, however, that any other suitable material may alternatively be utilized for bearing 138. Cap 122 may include a pair of shoulders 140 that may be disposed generally parallel with shoulders 133 on an opposing side of opening 136.

Figure 2:
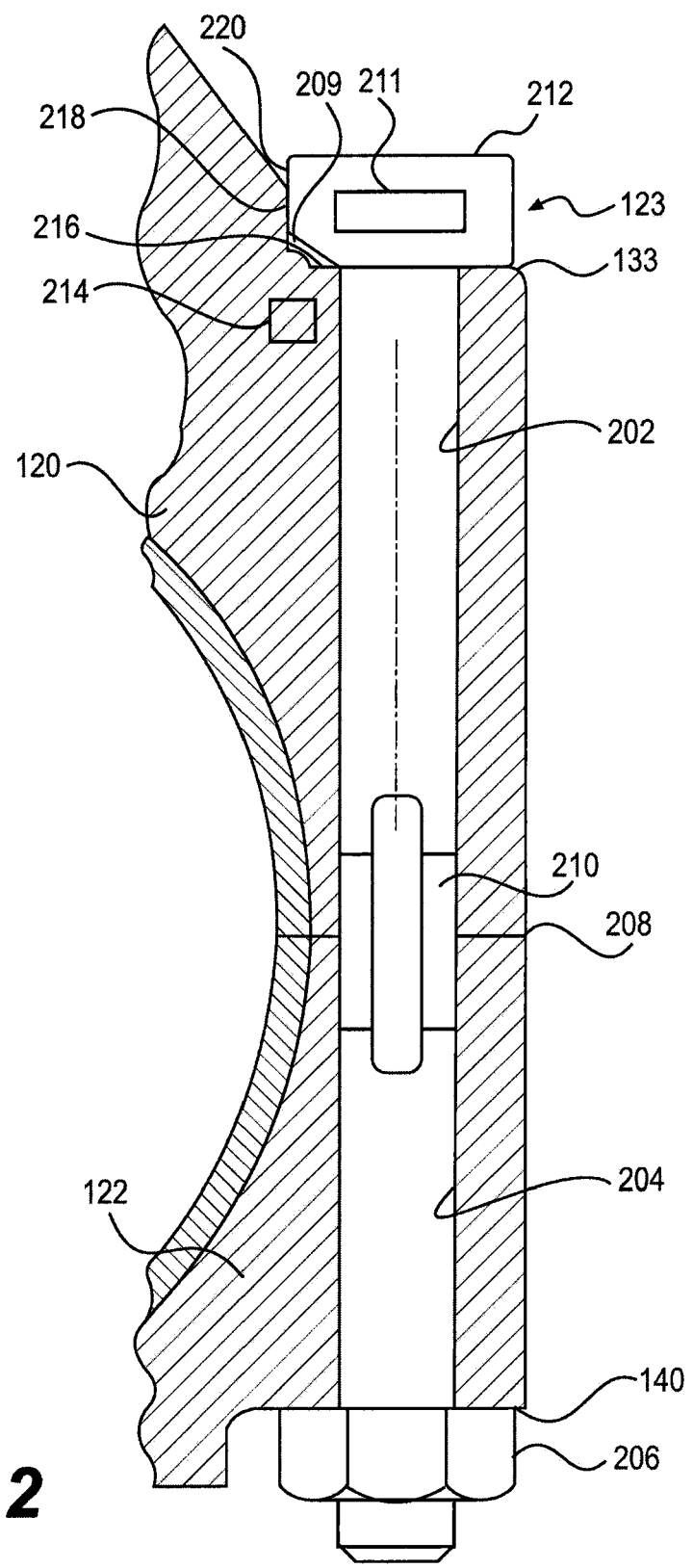
FIG. 2 is a cross-sectional illustration of an exemplary disclosed connecting rod assembly that may be used in conjunction with the engine of FIG. 1.

Referring to FIG. 2, connecting rod 120 and cap 122 may each have a bore 202 and 204, associated with each shoulder 133 and 140, respectively. Bores 202 and 204 may be substantially coaxially aligned for receiving a respective connecting rod bolt 123 therein. While shoulder 133 and shoulder 140 are illustrated in FIG. 2 as having a single mating pair of bores 202 and 204, it should be noted that a given pair of shoulders 133 and 140 may have any suitable number of associated mating pairs of bores 202 and 204. Each connecting rod bolt 123 may extend through a mating pair of bores 202 and 204 and attach connecting rod 120 with cap 122. A nut 206 may be threadingly engaged with a respective connecting rod bolt 123 and torqued to a desired load value. Nut 206 may have a hex configuration or any other suitable configuration.

Connecting rod 120 and cap 122 may join at a parting line 208. Connecting rod 120 and cap 122 may have substantially flat surfaces that engage each other at parting line 208, though other suitable forms of complimentary surfaces may alternatively be utilized. Connecting rod bolt 123 may have an axial alignment zone 210 that corresponds to parting line 208 when connecting rod bolt 123 is disposed within bores 202 and 204. In one exemplary embodiment, a length of axial alignment zone 210 may be about 30 mm (i.e., about 15 mm to either side of parting line 208), though any other suitable length may alternatively be utilized. Alternatively, a length of axial alignment zone 210 may be about 8-12 percent of the length of a body portion of connecting rod bolt 123. Alternatively, axial alignment zone 210 may be disposed in a plurality of discrete and unconnected sections along the length of connecting rod bolt 123. For example, one section of axial alignment zone 210 may align with bore 202, and a second portion of axial alignment zone 210 may align with bore 204. In this particular embodiment, an unmachined section of connecting rod bolt 123 may be disposed between the separate portions of axial alignment zone 210. Connecting rod 120 may also include a fillet 209 positioned adjacent to an opening of bore 202 when assembled properly within rod assembly 118. Connecting rod bolt 123 may have a connecting rod bolt feature 211 on a head portion 212 that is configured to align with a connecting rod feature 214. That is, when rod assembly 118 is assembled correctly, connecting rod bolt feature 211 and connecting rod feature 214 should face in the same general direction. Connecting rod bolt feature 211 and connecting rod feature 214 may be engraved, stamped, and/or printed on connecting rod bolt 123 and connecting rod 120 respectively.

It should be noted, however, that any other suitable identifying feature may alternatively be utilized, if desired.

Shoulder 133 may include a first surface 216 adjacent to an opening of bore 202, and a second surface 218 that is substantially perpendicular to first surface 216. Head portion 212 of connecting rod bolt 123 may further include an orienting feature 220 configured to abut second surface 218 when connecting rod bolt 123 is disposed in bores 202 and 204. Orienting feature 220 may be a substantially flat section of head portion 212. Alignment of orienting feature 220 with second surface 218 may ensure proper orientation of connecting rod bolt 123 within bores 202 and 204.

Figure 3:
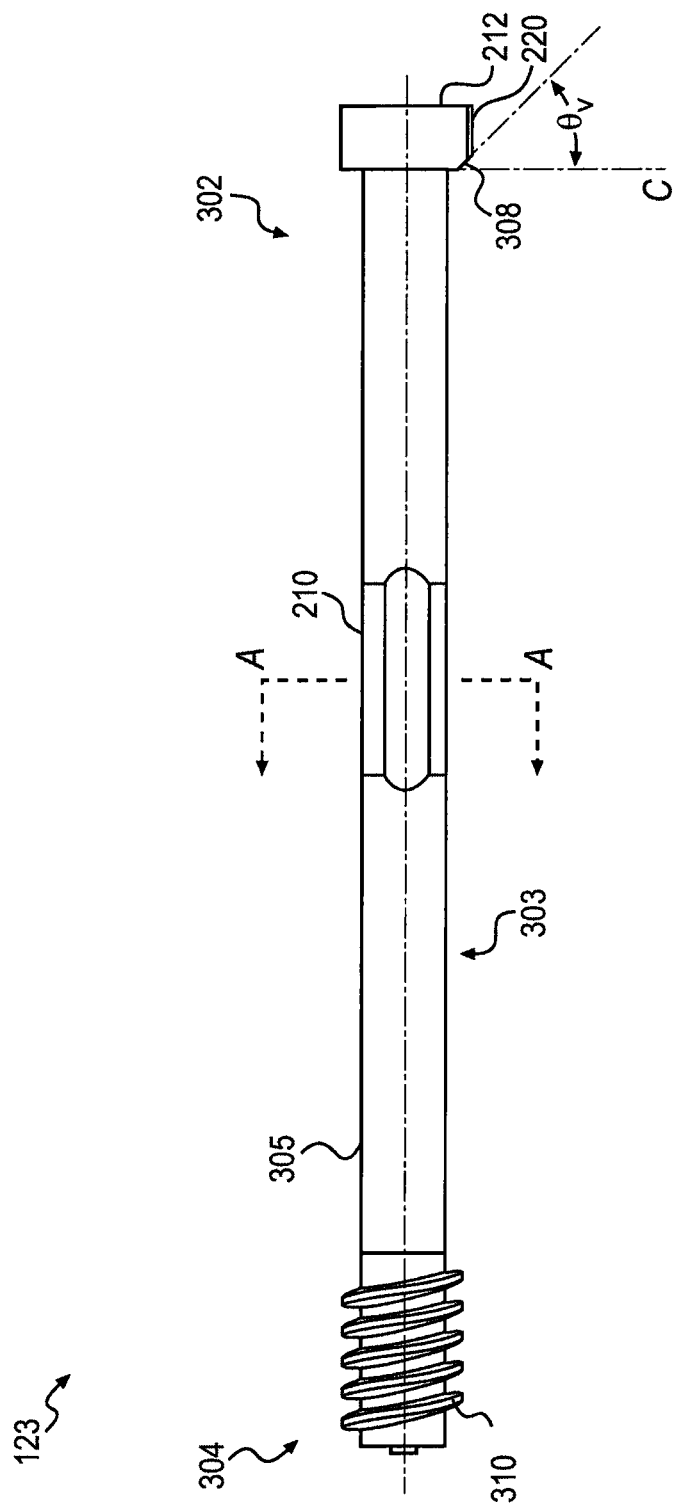
FIG. 3 is a pictorial illustration of an exemplary disclosed connecting rod bolt that may be used with the connecting rod assembly of FIG. 2.

Referring to FIG. 3, connecting rod bolt 123 may have a first end 302 at head portion 212, a body portion 303, a second end 304 opposite first end 302, and an outer surface 305 that extends in a length direction from first end 302 to second end 304 along body portion 303. Head portion 212 may include an internal chamfered edge 308 that extends only part-way around head portion 212. Internal chamfered edge 308 may provide clearance for fillet 209 of connecting rod 120 shown in FIG. 2, during installation of connecting rod bolt 123 within bores 202 and 204. That is, internal chamfered edge 308 may surround fillet 209 and may prevent head portion 212 from dislodging from connecting rod bolt 123 during assembly of rod assembly 118. Fillet 209 may be formed from a manufacturing imperfection of connecting rod 120. Internal chamfered edge 308 may be oriented at an angle $\theta_V$ with respect to an axial reference plane C. Internal chamfered edge 308 may thus extend from axial reference plane C toward the tip of head portion 212. $\theta_V$ may be about 45°. Connecting rod bolt 123 may also include threads 310 at second end 304 that are configured to threadingly engage nut 206. Alternatively, if connecting rod 120 does not have a fillet 209, head portion 212 may be substantially rectangular.

Figure 4:
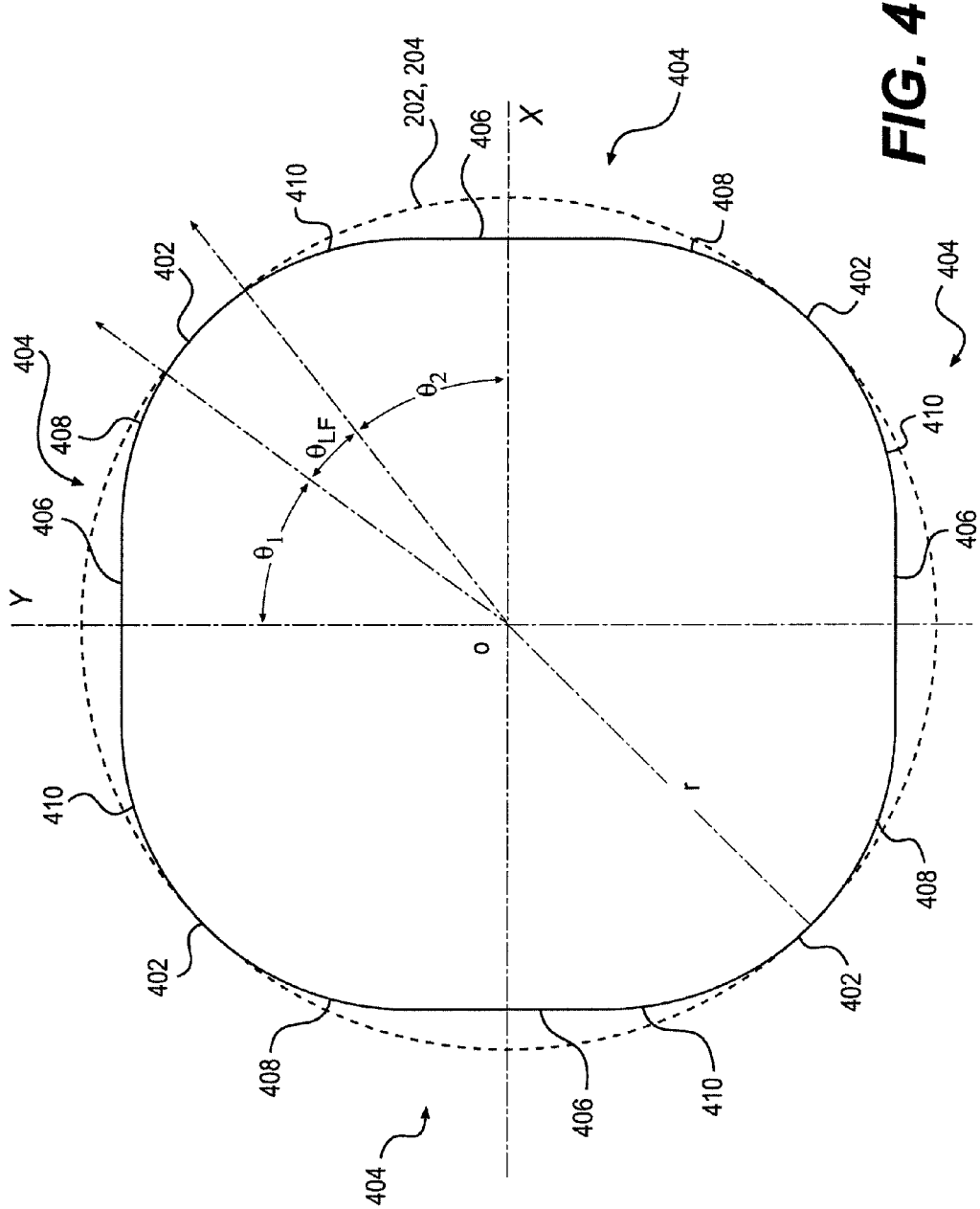
FIG. 4 is a cross-sectional view illustration taken along line A-A of the connecting rod bolt of FIG. 3.

FIG. 4 depicts a cross-sectional view of connecting rod bolt 123 taken along line A-A shown in FIG. 3. Connecting rod bolt 123 may include a plurality of locating features 402 within alignment zone 210 that are configured to contact inner annular surfaces of bores 202 and 204. Locating features 402 may be concentric arcs having a locating radius r from a center O of body portion 303 and aligned with outer surface 305 of body portion 303. That is, each point of any given locating feature 402 may be substantially equidistant from center O of body portion 303. Locating radius r may be substantially equal to a remaining, unmachined radius of connecting rod bolt 123. Locating feature 402 may be located between an angle $\theta_1$ with respect to a reference plane Y and an angle $\theta_2$ with respect to a reference plane X. Therefore, locating feature 402 may extend for an angle $\theta_{LF}$ in the space between reference planes X and Y. In one exemplary embodiment, $\theta_1$, $\theta_2$, and $\theta_{LF}$ may all be about 30°. However, it should be noted that any other suitable angles may alternatively be utilized. In another exemplary embodiment, $\theta_1$ and $\theta_2$ may be substantially equal and $\theta_{LF}$ may be greater or less than $\theta_1$ and $\theta_2$.

$\theta_{LF}$ may be selected such that locating features 402 do not lie in a dynamically moving plane of connecting rod 120 and cap 122. For example, during operation of engine 102, connecting rod 120 and cap 122 may vibrate and deflect along reference plane Y. If $\theta_{LF}$ is too large, there may be a risk that locating features 402 will approach the dynamically moving reference plane Y and cause connecting rod bolt 123 to contact moving surfaces of bores 202 and 204. This contact may cause connecting rod bolt 123 to fret over time. If $\theta_{LF}$ is too small, a pressure force exerted on connecting rod bolt 123 may be too large. It should be noted that alignment of orienting feature 220 of connecting rod bolt 123 with second surface 218 of shoulder 133 may ensure that locating features 402 are properly aligned with respect to reference planes X and Y.

Connecting rod bolt 123 may also include a plurality of clearance features 404 positioned between adjacent locating features 402. Clearance features 404 may be positioned along those portions of connecting rod bolt 123 that intersect dynamically moving reference plane Y. That is, clearance features 404 may be positioned along deflecting portions of connecting rod 120 and cap 122 in order to inhibit vibrational contact between connecting rod bolts 123 and bores 202 and 204. Clearance features 404 may thus be configured to avoid contact with bores 202 or 204 when connecting rod bolt 123 is disposed in bores 202 and 204. Clearance features 404 may be machined or forged into outer surface 305 of connecting rod bolt 123 such that a given distance from center O to clearance features 404 is less than locating radius r. Clearance features 404 may include a flattened portion 406 between a first transition portion 408 and a second transition portion 410. While four locating features 402 and four clearance features 404 are depicted in FIG. 4, any other suitable number of locating features 402 and clearance features 404 may alternatively be utilized. For example, connecting rod bolt 123 may be manufactured with two clearance features 404 if connecting rod 120 has one dynamically moving plane. In yet another alternative embodiment, head portion 212 may be substantially rectangular, and connecting rod bolt 123 may have four clearance features 404 to allow connecting rod bolt 123 to have multiple correct orientations within rod assembly 118.

In one embodiment, locating features 402 and clearance features 404 may be located only in axial alignment zone 210 along the outer surface of connecting rod bolt 123. That is, in order to reduce production costs, locating features 402 and clearance features 404 may only be machined or forged into a portion of connecting rod bolt 123 that is near the vicinity of parting line 208 where connecting rod 120 and cap 122 meet. It is contemplated, however, that locating features 402 and clearance features 404 may alternatively extend along the entire length of connecting rod bolt 123, if desired.

Figure 5:
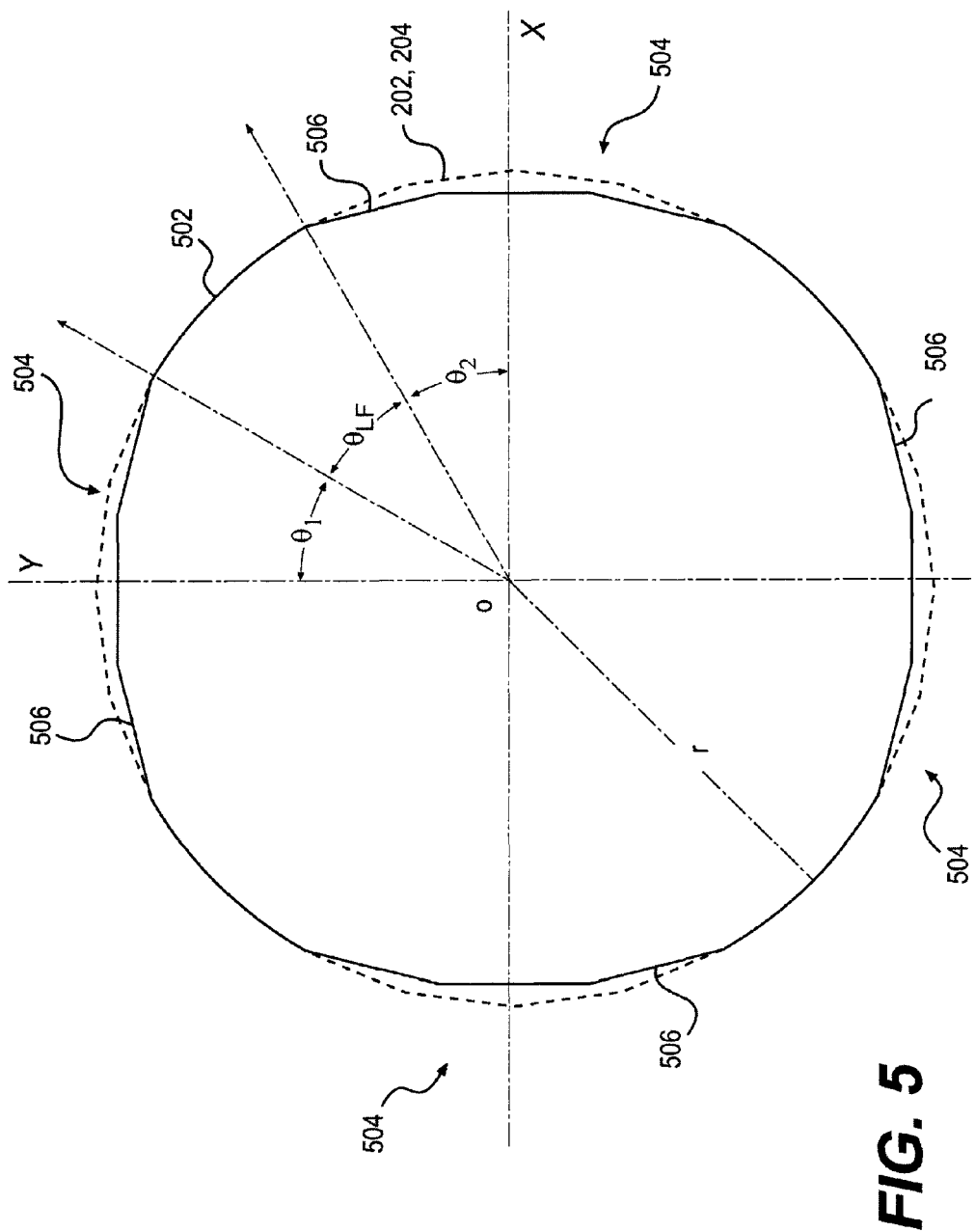
FIG. 5 is a cross-sectional view illustration taken along line A-A of an alternative embodiment of the connecting rod bolt of FIG. 3.

FIG. 5 depicts an alternative embodiment of connecting rod bolt 123 taken along line A-A shown in FIG. 3. In this exemplary embodiment, connecting rod bolt 123 may have a plurality of locating features 502 that are substantially similar to locating feature 402 shown in FIG. 4, and a plurality of clearance features 504. Clearance features 504, in contrast to clearance features 404 of FIG. 4, however, include a plurality of substantially flattened transition portions 506 that may have a lower manufacturing cost than transition portions 408 and 410 of FIG. 4. Flattened transition portions 506 may have a lower manufacturing cost because they may require simpler machinery. However, if suitable machinery is available, transition portions 408 and 410 may have a reduced manufacturing time.

INDUSTRIAL APPLICABILITY

The disclosed connecting rod bolt may be applicable to any engine having a connecting rod assembly where longevity of the connecting rod assembly is an issue. The disclosed connecting rod bolt may help reduce bolt fretting by preventing contact between the bolt and a bore along the connecting rod assembly in dynamically moving planes. Because the disclosed connecting rod bolt may reduce fretting, the disclosed connecting rod bolt may have a longer useful life than existing connecting rod bolts. Assembly of connecting rod bolt 123 and rod assembly 118 will now be described.

Connecting rod bolts 123 may be inserted into bores 202 of connecting rod 120 such that connecting rod bolt feature 211 and connecting rod features 214 generally align with each other. Second chamfered edge 308 may surround fillet 209 of connecting rod 120 to prevent dislodging of head portion 212. Cap 122 may then be positioned so that bores 204 receive second ends 308 of connecting rod bolts 123 extending out of bore 202. Nuts 206 may then be mated with threads 310 of connecting rod bolt 123 and torqued.

Referring to FIGS. 4 and 5, during operation of engine 102, connecting rod 120 and cap 122 may dynamically move consistently up and down reference plane Y. Because connecting rod bolt 123 may be recessed along this dynamically moving plane via clearance features 404 or 504, fretting may be reduced or even prevented. That is, because connecting rod bolts 123 may substantially avoid contact with dynamically moving inner annular surfaces of bores 202 and 204, connecting rod bolt 123 and bores 202 and 204 may be prevented from microscopically welding due to friction forces. The disclosed connecting rod bolts may provide a simple and elegant mechanism for aligning components of rod assembly 118. The disclosed connecting rod bolt may extend engine and/or connecting rod life by reducing fretting and cracking of the connecting rod bolt and associated connecting bores.

It will be apparent to those skilled in the art that various modifications and variations can be made to the disclosed connecting rod bolt without departing from the scope of the disclosure. Other embodiments of the connecting rod bolt will be apparent to those skilled in the art from consideration of the specification and practice of the connecting rod bolt disclosed herein. It is intended that the specification and examples be considered as exemplary only, with a true scope of the disclosure being indicated by the following claims and their equivalents.

What is claimed is:

1. A connecting rod bolt, comprising:
   a body portion having a first end, a threaded second end opposite the first end, and an outer surface extending in a length direction from the first end to the second end;
   a plurality of locating features disposed on the body portion, wherein the plurality of locating features are concentric arcs having a radius substantially equal to a radius of the outer surface;
   a plurality of clearance features positioned between adjacent locating features, wherein a distance from a center of the body portion to each clearance feature is less than the radius of the plurality of locating features; and
   a head portion connected to the first end of the body portion,
   wherein each of the plurality of locating features and the plurality of clearance features extend at least along an entire length of an axial alignment zone of the body portion, and
   wherein each of the plurality of clearance features includes a plurality of substantially flat transition portions between adjacent locating features.

2. The connecting rod bolt of claim 1, wherein the plurality of locating features includes four locating features.

3. The connecting rod bolt of claim 1, wherein:
   a length of the axial alignment zone is less than a length of the body portion.

4. The connecting rod bolt of claim 3, wherein the length of the axial alignment zone is about 8-12 percent of a length of the body portion.

5. The connecting rod bolt of claim 1, wherein:
   each of the plurality of locating features extend at a first angle from a first plane passing through the center of the body portion and at a second angle from a second plane that is substantially perpendicular to the first plane; and wherein the first and second angles are substantially equal.

6. The connecting rod bolt of claim 1, wherein the head portion includes an internal chamfered edge at the head portion that extends only part-way around the head portion.

7. A connecting rod bolt, comprising:
a body portion having a first end, a threaded second end opposite the first end, and an outer surface extending in a length direction from the first end to the second end;
a plurality of locating features disposed in an axial alignment zone of the body portion, wherein a length of the axial alignment zone is less than a length of the body portion, and wherein the plurality of locating features are concentric arcs having a radius substantially equal to a radius of the outer surface;
a plurality of clearance features positioned between adjacent locating features; and
a head portion connected to the first end of the body portion,
wherein each of the plurality of locating features and the plurality of clearance features extends at least along an entire length of the axial alignment zone, and
wherein:
each of the plurality of locating features extends for a first angle in between a second angle from a first plane passing through a center of the body portion and a third angle from a second plane that is substantially perpendicular to the first plane; and
the first, second, and third angles are substantially equal.

8. The connecting rod bolt of claim 7, wherein the plurality of locating features includes four locating features.

9. The connecting rod bolt of claim 7, wherein the head portion includes an internal chamfered edge at the head portion that extends only part-way around the head portion.

10. The connecting rod bolt of claim 7, wherein each of the plurality of clearance features includes a plurality of substantially flat transition portions.

11. A connecting rod assembly, comprising:
a connecting rod having a first shoulder and first bore disposed within the first shoulder;
a cap having a second shoulder and a second bore disposed within the second shoulder in alignment with the first bore;
a connecting rod bolt disposed in the first and second bores, the connecting rod bolt including:
a body portion having a first end, a threaded second end opposite the first end, and an outer surface extending in a length direction from the first end to the second end;
a plurality of locating features each being a concentric arc having a radius disposed in an axial alignment zone of the outer surface and configured to contact the first and second bores, wherein a length of the axial alignment zone is less than a length of the body portion;
a plurality of clearance features positioned between adjacent features of the plurality of locating features, wherein a distance from a center of the body portion to each of the plurality of clearance features is less than the radius of each of the plurality of locating features; and
a head portion connected to the first end of the body portion, the head portion configured to contact the first shoulder of the connecting rod,
wherein each of the plurality of locating features and the plurality of clearance features extends at least along an entire length of the axial alignment zone, and
wherein each of the plurality of clearance features includes a plurality of substantially flat transition portions between adjacent locating features; and
a nut configured to engage the second shoulder of the cap and the threaded second end of the connecting rod bolt.

12. The connecting rod assembly of claim 11, wherein:
the connecting rod further includes a connecting rod feature; and
the connecting rod bolt further includes a connecting rod bolt feature generally aligned with the connecting rod feature when the connecting rod bolt is correctly assembled within the connecting rod.

13. The connecting rod assembly of claim 11, wherein the head portion includes an internal chamfered edge at the head portion that extends only part-way around the head portion.

14. The connecting rod assembly of claim 13, wherein:
the connecting rod further includes a fillet adjacent to an opening of the first bore; and
the internal chamfered edge generally surrounds the fillet.

15. The connecting rod assembly of claim 11, wherein:
each of the plurality of locating features extend at a first angle from a first plane passing through the center of the body portion and at a second angle from a second plane that is substantially perpendicular to the first plane; and
wherein the first and second angles are substantially equal.

16. The connecting rod assembly of claim 11, wherein the plurality of locating features includes four locating features.

* * * * *